Sept. 28, 1943. W. R. MITTENDORF 2,330,372
RETAINING MEANS
Filed Nov. 12, 1940

INVENTOR.
WILLIAM R. MITTENDORF
BY
ATTORNEY

Patented Sept. 28, 1943

2,330,372

UNITED STATES PATENT OFFICE 2,330,372

RETAINING MEANS

William R. Mittendorf, Cincinnati, Ohio, assignor to The Crosley Corporation, Cincinnati, Ohio, a corporaton of Ohio Application November 12, 1940, Serial No. 365,201

2 Claims. (Cl. 85—32)

This invention relates to the art of supports and is particularly concerned with retaining means for supports, supporting brackets, or other devices to be attached to walls. The invention has particular application to the inner walls—sometimes known as "liners"—of refrigerator cabinets but is not limited thereto, since it may be used with equal benefit in many other types of construction.

The invention will be described in connection with refrigerator cabinets since I have found it of particular utility in the manufacture of this product. Various retaining means have heretofore been suggested for supporting devices within the liners of such cabinets, ranging from a simple bolt extending through an aperture in the liner and retained by a nut on the other side, to devices of the expansion type where the nut or its equivalent expands either within the aperture or on the opposite side of the liner and permits a bolt or screw to be drawn up tightly against the liner. Devices of this character must be lined up accurately with the bracket or other means to be retained on, or connected with, the liner wall and this necessitates manufacturing accuracy within very close tolerances.

With refrigerator cabinets in which devices of the nature above outlined are used, moisture often finds its way through the aperture provided for mounting the devices on or in the liner. Although the cooperating threads of such devices are usually sufficient, when drawn up tightly, to prevent the ingress or egress of moisture, there are often small communicating channels left open, through which moisture may find its way to the chamber containing insulation. This is extremely undesirable since it leads to mold growth within the insulation, for there is insufficient space through which adequate air circulation for drying can take place. In other words, moisture may find its way into the insulation chamber but can be removed therefrom only with difficulty.

Furthermore, where retaining devices are provided with expansion members or other means disposed on the insulation side of the liner and the assembly of supports is made from the inside of the liner, the retaining means on the insulation side is frequently lost and it is practically impossible to retrieve it.

According to the present invention I have provided an extremely simple retaining means adapted to be put in place prior to the time the liner is inserted in the refrigerator cabinet. Such means may be instantly snapped in place in a proper aperture provided in the liner wall and such apertures need only be approximately spaced or positioned with respect to the cooperating parts of the supports sought to be retained. This eliminates the necessity of close manufacturing tolerances. The invention further provides for holding the retaining device in substantially fixed position so that the parts thereof are held in place and cannot easily be dislodged and lost. The invention likewise provides for sealing the aperture through which it is inserted and in which it is mounted thereby preventing contamination of the insulation.

The novel features that I consider characteristic of my invention are set forth in the appended claims. The invention itself, however, both as to its organization and its method of operation, together with additional objects and advantages thereof, will best be understood from the following description of a specific embodiment when read in conjunction with the accompanying drawing in which:

Figure 1:
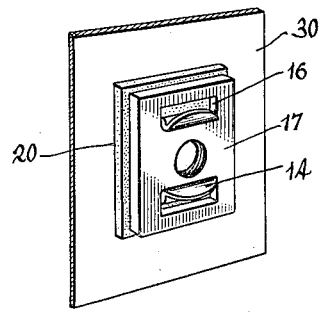
Figures 1 and 2 are perspective views respectively, of the back or insulation side, and front side of a retaining device, constructed in accordance with the present invention, parts only of the cooperating cabinet wall being shown.
Figure 2:
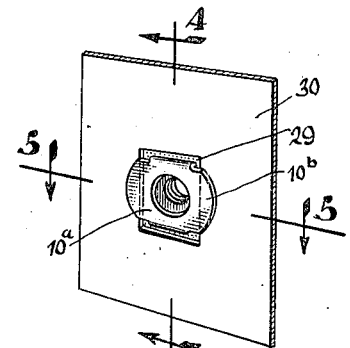
Figure 3:
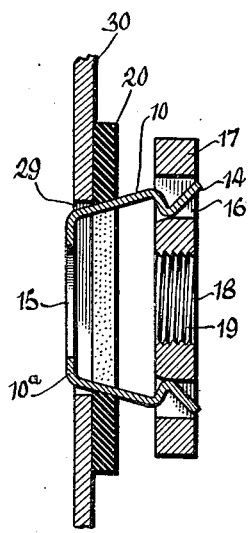
Figure 3 is a section taken along the line 4—4 of Figure 2 showing the device of the invention in partly assembled position with respect to the cabinet liner.
Figure 4:
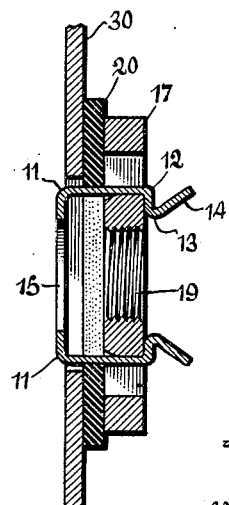
Figure 4 is a view similar to Figure 3 with the retainer in completely assembled position with respect to the liner.
Figure 5:
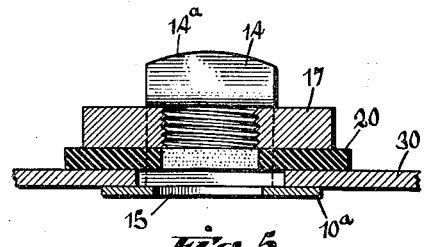
Figure 5 is a section taken along line 5—5 of Figure 2.
Figure 7:
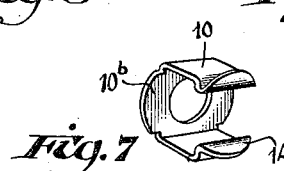
Figure 7 is a perspective view of a spring clip like that shown in the assemblies of preceding views.

Referring first to Figures 3 and 4 it will be seen that the retaining device of the present invention may comprise a spring clip 10 of phosphor bronze or similar resilient material bent so that it has a section like that shown in the figures referred to. As shown in Figure 4, the spring piece 10 may be bent at right angles to its front face 10ª as at 11 and again as at 12 in order to provide a shoulder for retaining a nut 17 later to be described. The spring piece is preferably reversely bent as at 13 and its end portion 14 rounded off as indicated at 14ª. The front flat face 10ª has a circular aperture 15 centrally thereof and its front surface is extended diametrically in one direction to form lips 10ᵇ as shown in Figures 2 and 7.

The nut 17 is preferably rectangular in shape and is provided with a pair of rectangular openings 16 through which the ends 14 of clip 10 may be inserted. It also has a central aperture 18 threaded as at 19 for the reception of a screw or similar member adapted to extend through and secure a member to be supported. Retaining nut 17 may be of any desired material but is preferably of steel. It may be advantageous to chamfer one edge of the apertures 16 as indicated in Figures 3 and 4 in order to permit the ready insertion of the end members or prongs 14 of the spring clip 10.

Gasket 20 preferably of soft rubber may be disposed between the retaining nut 17 and the wall 30 of the liner which wall has an aperture 29 therein through which the retainer assembly may be inserted and to which it is secured.

Figure 6:
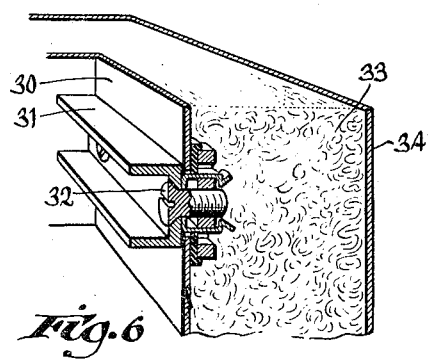
Figure 6 is a view showing a section of the retaining means in place in the liner wall with a channel bracket supported thereby by means of a screw, together with other parts of a refrigerator cabinet shown in perspective.

In mounting the retaining means, the liner is disposed, prior to assembly with the cabinet, in a position where the worker can readily reach both sides of the aperture 29. The pronged ends 14 of one spring piece 10 are then inserted in the aperture 29 and the gasket 20 placed over the prongs from the other side. The retaining nut is then slid over the prongs so that they enter apertures 16. The initial position is indicated in Figure 3. Further pressure on the nut on one side and the flat outer face 10ª of the spring clip 10 causes the reversely turned portion 13 to slip in back of the nut and hold the members together as indicated in Figure 4. The mounting of a bracket such as shown at 31 in Figure 6, may afterwards be easily accomplished by merely aligning drilled holes therein with aperture 18 and inserting a screw 32. Take-up on the screw 32 pulls the assembly even more tightly together and pulls the nut firmly against the gasket 20 which in turn is pressed against the wall 30 of the liner, thereby making a watertight joint.

It should be noted that the aperture 29 within the liner 30 is somewhat large in size and permits the retaining means to move about. This might be termed a loose or "sloppy" fit. However, it is advantageous to provide such a loose fit since the bracket 31 or other device to be attached to the inner side of the liner, need not have its corresponding apertures accurately spaced and the retainer assembly may be easily shifted to a position where it is in alignment with the cooperating apertures of the bracket so it can accommodate the supporting screw. Any looseness in the fit is remedied when the supported member is attached and the screw or other means taken up to bring the device in close association with the liner wall.

Figure 8:
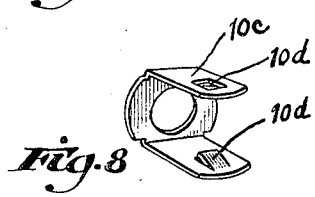
Figure 8 is a view similar to Figure 7 of a modified form of spring clip.

In Figure 8 a modified form of clip is shown having straight prongs 10ᶜ having lugs 10ᵈ struck down and struck up therefrom, as shown. The lugs 10ᵈ are adapted to perform the same function as the shoulders of the form shown in Figure 7 and may be found to be a more simple and less costly type of clip to use.

Various modifications of the invention will readily appear to persons skilled in the art.

Having thus described my invention, I claim:

1. A retaining device for retaining a member against a wall through an aperture therein comprising a spring clip having an apertured flat face, lateral extensions on said face adapted and arranged to lie flush against said wall, said clip having shouldered resilient prongs which in use extend through the wall aperture, and a nut having apertures therein for receiving and engaging the shoulder of each prong when fully extended through said apertures and for receiving a screw.

2. A retaining device for retaining a member against a wall through an aperture therein comprising a spring clip having an apertured flat face having lateral extensions thereon which in use lie flush against one side of said wall, said clip having resilient prongs which in use extend through the wall aperture, said prongs having shouldered ends, a retaining member having apertures for receiving said shouldered ends and having a portion for engaging the same when fully extended through said apertures whereby said retaining member may be secured against the other side of said wall, and a gasket disposed around said prongs and between the flat face of said clip and said retaining member.

WILLIAM R. MITTENDORF.